United States Patent
Rapisarda

[11] Patent Number: 5,857,273
[45] Date of Patent: *Jan. 12, 1999

[54] FOOTWEAR DECORATED WITH A FLEXIBLE LIGHTED STRIP

[76] Inventor: Carmen C. Rapisarda, 21211 Wisteria St., Apple Valley, Calif. 92308

[*] Notice: The term of this patent shall not extend beyond the expiration date of Pat. No. 5,649,755.

[21] Appl. No.: 899,622

[22] Filed: Jul. 19, 1997

Related U.S. Application Data

[63] Continuation-in-part of Ser. No. 603,716, Feb. 20, 1996, Pat. No. 5,649,755.

[51] Int. Cl.⁶ .............................. A43B 23/00; F21L 15/08
[52] U.S. Cl. ............................ 36/137; 36/136; 362/103; 362/32
[58] Field of Search .............................. 36/137, 136, 132, 36/2.6; 362/103, 32, 800

[56] References Cited

U.S. PATENT DOCUMENTS

| | | | |
|---|---|---|---|
| 4,724,024 | 2/1988 | Van Der Velde et al. | 156/181 |
| 4,727,603 | 3/1988 | Howard | 362/103 |
| 4,761,047 | 8/1988 | Mori | 362/32 |
| 5,149,489 | 9/1992 | Crews | 362/32 |
| 5,477,424 | 12/1995 | Mocha | 362/32 |
| 5,502,903 | 4/1996 | Barker | 36/137 |
| 5,649,755 | 7/1997 | Rapisarda | 362/32 |

FOREIGN PATENT DOCUMENTS

| | | | |
|---|---|---|---|
| 534560 | 3/1993 | European Pat. Off. | 36/137 |
| 94/15494 | 7/1994 | WIPO | 36/137 |

*Primary Examiner*—M. D. Patterson
*Attorney, Agent, or Firm*—Edgar W. Averill, Jr.

[57] ABSTRACT

A shoe decorated with a flexible lighted strip. The shoe has a light contained within its sole. A transparent flexible strip passes from the light within the sole outwardly and covers either a portion of the sole or a portion of the upper of the shoe. Preferably, the strip is made from plasticized polyvinyl chloride.

8 Claims, 3 Drawing Sheets

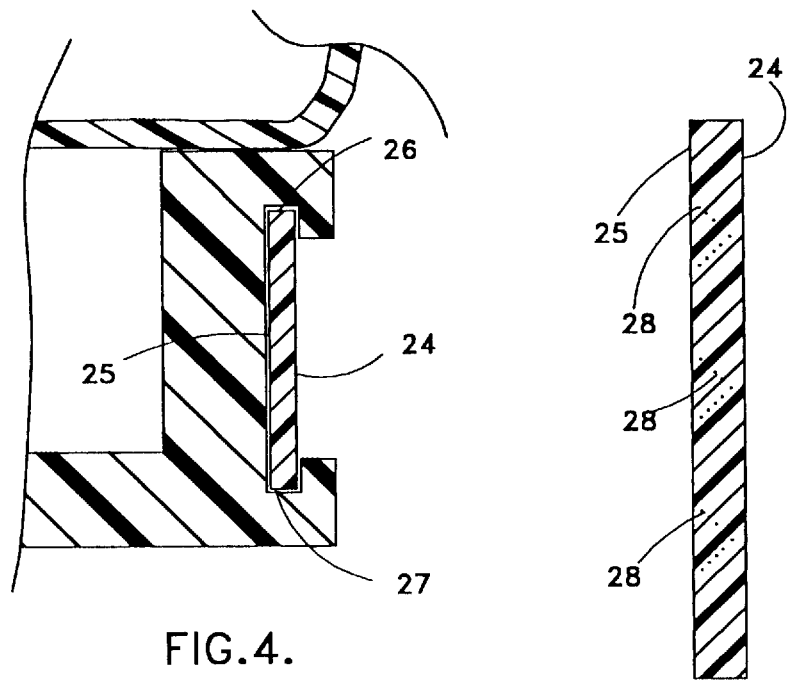
FIG.4.
FIG.5.
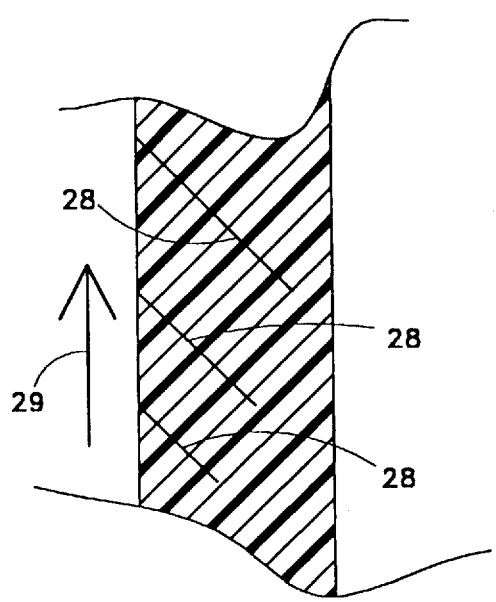
FIG.6.

FOOTWEAR DECORATED WITH A FLEXIBLE LIGHTED STRIP

This application is a continuation-in-part of applicant's pending U.S. Ser. No. 08/603,716 filed Feb. 20, 1996, now U.S. Pat. No. 5,649,755.

BACKGROUND OF THE INVENTION

The field of the invention is lighted footwear and the invention relates more particularly to footwear of the type illuminated by a light source positioned within the sole of the shoe.

A surprising number of lighted shoes have been patented. Applicant's still-pending application Serial No. 08/105,465 shoe application shows a light module imbedded in the heel of a shoe and a light-emitting diode visible from the outside of the heel. The light was turned on by the weight of the wearer. This shoe had substantial commercial success. The following patents were cited against this initial application:

| | |
|---|---|
| Goldston, et al. | 5,285,586 |
| Chang | 5,235,761 |
| Duval | 3,800,133 |
| Randolph | 1,597,823 |
| Humeau | 2,556,190 |
| Stoschek | 3,824,352 |

Numerous other patents have issued after this initial success, including U.S. Pat. Nos. 5,490,338, 5,419,061, 5,430,621 and 5,502,903.

Although these illuminated shoes provide a degree of safety and novelty, it has been noted that there is an increasing interest in applying specific decorations or words along the side of a shoe. Such decorations could include the manufacturer's trademark, names of famous basketball players or other athletes or names of music groups and the like.

BRIEF SUMMARY OF THE INVENTION

It is an object of the present invention to provide a lighted shoe which has the ability to impart decorations or words visible at night from the exterior of the shoe.

The present invention is for a shoe decorated with a flexible lighted strip. The shoe has a flexible sole. A source of light having a light-transmitting area is held within the inner volume of the flexible sole. A unitary length of clear solid flexible polymer is held so that its inner end is within the sole of the shoe. The length of flexible polymer has a flattened body and at least a portion of the flattened body extends outwardly from the sole and either covers a side of the sole or a portion of the upper of the shoe or is situated behind a clear window in the sole of the shoe. Decorations are provided by a plurality of discreet marks formed on one of the surfaces. Preferably the discreet marks are slits cut into the flexible polymer from the inner surface.

BRIEF DESCRIPTION OF THE DRAWINGS

FIG. 4 is an enlarged cross-sectional view taken along line 4—4 of FIG. 1.

FIG. 5 is an enlarged cross-sectional view of the flexible strip shown in FIG. 4.

FIG. 6 is an enlarged cross-sectional top view of the flexible strip portion of FIG. 5.

DISCRIPTION OF THE PREFERRED EMBODIMENTS

Figure 1:
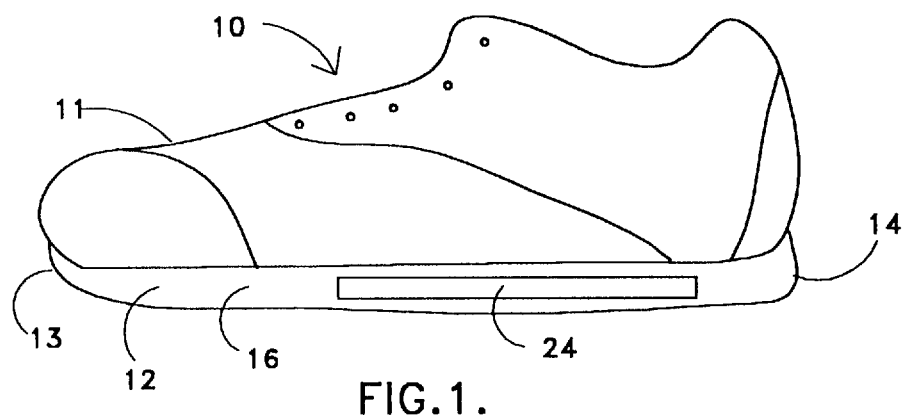
FIG. 1, is a side view of the shoe decorated with a flexible lighted strip of the present invention.
Figure 2:
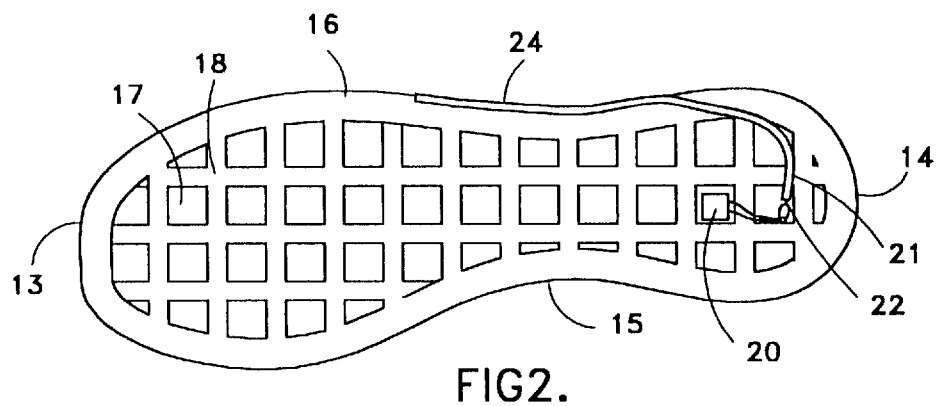
FIG. 2 is a cross-sectional view taken along line 2—2 of FIG. 1.
Figure 3:
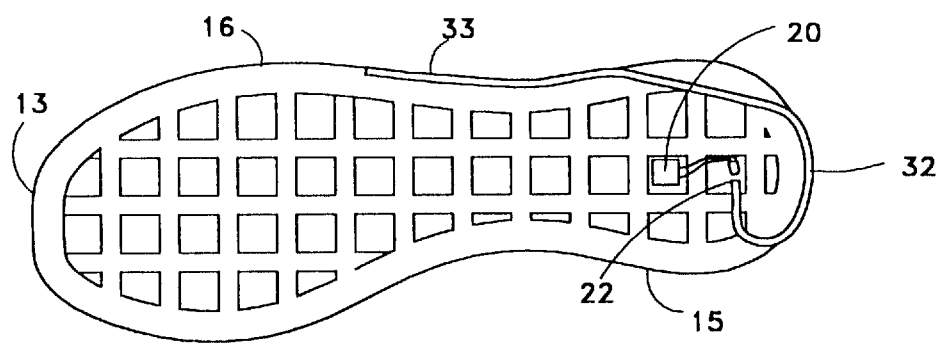
FIG. 3 is a view analogous to FIG. 2 except showing a different configuration of the lighted strip.

The shoe decorated with a flexible lighted strip is shown in FIG. 1 and indicated generally by reference character 10. Shoe 10 has a conventional upper 11 and a flexible sole 12. Sole 12 is shown in cross-sectional view in FIG. 2 where it can be seen that sole 12 has a toe area 13, a heel area 14 and an outer side 16.

Sole 12 has a plurality of openings 17 between flexible walls 18 to provide a flexible support by the wearer. The particular configuration of the sole is optional and could, of course, be a foamed material or other construction. The sole provides an area for holding a source of light such as LED 19 which is connected to a controlled power source such as a battery and circuitry with provisions to intermittently provide power to LED 19. This circuitry could be activated either by motion, by the weight of the wearer's heel, by a switched intermittent source provided by a flexible spring surrounding a conductor or by an electronic circuit providing such intermittent light. The particular source of light is not an important feature of the present invention, only that the light be intermittent. It is within the purvue of the present invention that the intermittent source be turned on for a period of time and then turned off wherein the intermittent period would be a long one, however, it is important that the light be capable of being turned on and off and preferably is a blinking light to attract attention.

Figure 9:
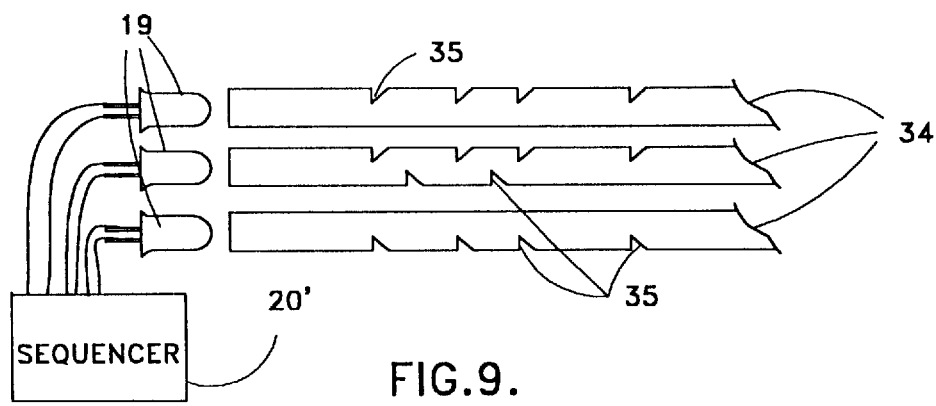
FIG. 9 is a diagrammatic view of an alternate embodiment of the lighted assembly of the shoe of FIG. 1.

The important feature of the present invention is a unitary length of clear solid flexible polymer 21 which has a first end 22 adjacent LED 19 and a remote end 23. As shown best in FIG. 4, the length of flexible polymer is preferably a flattened length having an outer surface 24, an inner surface 25, a top edge 26 and a bottom edge 27. Preferably, the unitary length of clear solid flexible polymer 21 has discreet marks formed from the inner or outer surface to cause the light to be reflected in a predetermined pattern such as a trademark. One particularly effective way of providing such a discreet mark is by forming a thin cut such as cut 28 shown in FIGS. 5 and 6. Preferably, the cuts are formed at an angle so that light passing in the direction of arrow 29 is reflected outwardly to be visible from the exterior of the shoe. Another preferred marking is a molded notch such as notches 35 shown in FIG. 9. Other types of marks such as molded indentations or protrusions may also be used.

Figure 7:
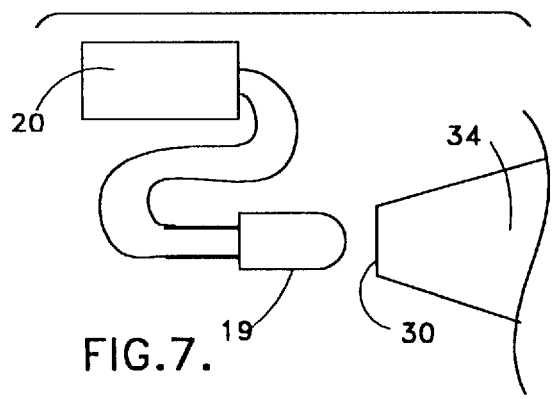
FIG. 7 is an enlarged view of the light source and the first end of the flexible polymer of the shoe of FIG. 1.

An enlarged view of LED 19, controlled power source 20 and the first end 30 of the unitary length of clear solid flexible polymer 21 is shown in FIG. 7. It is important that the source of light be aimed at the first end so that light may be efficiently conducted along the length of the flexible polymer.

Figure 8:
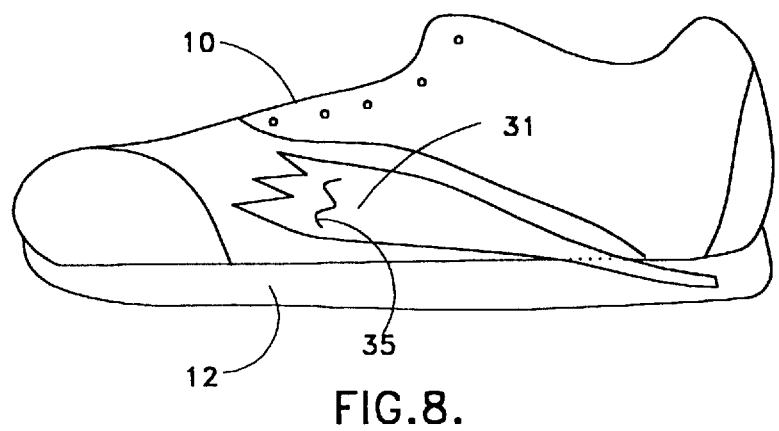
FIG. 8 is a side view showing an alternate configuration of the shoe decorated with a flexible lighted strip.

While a flat generally rectangular strip has been shown in FIGS. 1 through 6, the flexible strip may instead be shaped in any desired shape. One such shape is indicated in FIG. 8 where the unitary length of clear solid flexible polymer is molded into a shape and indicated by reference character 31. Once again, the source of light for this polymer is LED 19 held within the heel. By utilizing the version of FIG. 8 the flexible strip may contain a larger amount of indicia such as a design indicated by reference character 35 in FIG. 8.

It is also contemplated that several integral assemblies could be held side by side and controlled by a single controller such as sequencer 20'. This permits the control of the individual LEDs 19 to cause an appearance of motion or a sparkling visual effect. Also the LEDs 19 in FIG. 9 could be of different colors to provide further visual effects.

While flexible clear plasticized polyvinyl chloride is the preferred polymer, other highly flexible polymers capable of transmitting light could also be used. It is, however, important that the polymer be relatively soft so that it can easily flex with the sole of the shoe on which it is held. Although the strip is shown captured within a molded cavity, other holding methods such as an adhesive or sewing may also be utilized. Furthermore, the clear strip 21 could be held behind a transparent window so that the indicia on strip 21 is visible through the transparent window. An important advantage of the present invention over most of the prior art lighted shoes is the ability to transmit a design, or words instead of just one or more points of light.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A shoe decorated with a flexible lighted strip, said shoe being of the type having a flexible sole with a floor-contacting bottom, an interior top and a peripheral edge surrounding an inner volume of said flexible sole, said flexible sole including a toe area, a heel area, outer side and an inner side, said shoe comprising:

a source of light having a light transmitting area, said source of light being held within said shoe;

a unitary length of clear, solid, flexible polymer having a first end adjacent said light transmitting area within said shoe and an elongated, flattened body having an outer surface, an inner surface, and two edges and said length having a remote end, said unitary length of clear, flexible polymer conducting light from its first end to said remote end, said unitary length extending from its first end to an area where the outer surface of said unitary length is exposed along an exposed portion along at least a portion of said shoe; and wherein said unitary length of clear, solid, flexible polymer contains at least one discreet mark formed from at least one of said outer and inner surfaces along said visible portion of said outer surface.

2. The shoe decorated with a flexible light strip of claim 1 wherein said discreet marks comprise cuts formed from said inner surface at an angle to the inner surface to reflect areas of light in a predetermined design.

3. The shoe decorated with a flexible light strip of claim 1 wherein said visual portion is along said outer side of said sole.

4. The shoe decorated with a flexible light strip of claim 1 wherein said unitary length of clear flexible polymer is fabricated from plasticized polyvinyl chloride.

5. The shoe decorated with a flexible light strip of claim 1 wherein said source of light is a light emitting diode.

6. The shoe decorated with a flexible light strip of claim 5 wherein said source of light is an intermittent source of light.

7. The shoe decorated with a flexible light strip of claim 1 wherein there are a plurality of flexible light strips oriented in a parallel fashion on said shoe.

8. A shoe decorated with a flexible lighted member, said shoe being of the type having a flexible sole with a floor-contacting bottom, an interior top and a peripheral edge surrounding an inner volume of said flexible sole, said flexible sole including a toe area, a heel area, outer side and an inner side, and said shoe having a flexible upper, said shoe comprising:

a source of light having a light transmitting area, said source of light being held within said inner volume of said flexible sole; and at least one unitary length of clear, solid, flexible polymer having a first end adjacent said light transmitting area within said inner volume and an elongated, flattened body having an outer surface, an inner surface, and two edges and said length having a remote end, said at least one unitary length of clear, flexible polymer conducting light from its first end to said remote end, said unitary length extending from its first end to an area where the outer surface of said unitary length is exposed over a portion of said upper of said shoe and wherein said unitary length of clear, flexible polymer has discreet marks from at least one of the inner and outer surfaces to cause the light to be reflected in a predetermined pattern.

\* \* \* \* \*